(12) United States Patent
Mann

(10) Patent No.: US 6,314,530 B1
(45) Date of Patent: Nov. 6, 2001

(54) PROCESSOR HAVING A TRACE ACCESS INSTRUCTION TO ACCESS ON-CHIP TRACE MEMORY

(75) Inventor: Daniel Mann, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 08/991,970

(22) Filed: Dec. 17, 1997

Related U.S. Application Data

(60) Provisional application No. 60/043,070, filed on Apr. 8, 1997.

(51) Int. Cl.[7] .................................................... H02H 3/05
(52) U.S. Cl. ........................ 714/38; 714/25; 714/30; 714/31; 714/46
(58) Field of Search .................... 712/1, 227; 714/8, 714/38, 45, 34, 30, 46, 31, 33, 25

(56) References Cited

U.S. PATENT DOCUMENTS

| 3,707,725 | 12/1972 | Dellheim ................................ 444/1 |
| 4,429,368 | * 1/1984 | Kurii ..................................... 714/38 |

(List continued on next page.)

FOREIGN PATENT DOCUMENTS

| 316609 | 5/1989 | (EP) . |
| 0530816A3 | 3/1993 | (EP) . |
| 636976 | 2/1995 | (EP) . |
| 762276 | 3/1997 | (EP) . |
| 849670 | 6/1998 | (EP) . |
| 59194245 | 11/1984 | (JP) . |

OTHER PUBLICATIONS

IBM Technical Disclosure Bulletin "Tailorable Embedded Event Trace", vol. 34, No. 7B, Dec. 1991, pp. 259–261.
Intel "Pentium™ Processor User's Manual vol. 3: Architecture and Programming Manual", 1994, pp. 17–1 thru 17–9.

(List continued on next page.)

*Primary Examiner*—Richard Hjerpe
*Assistant Examiner*—Mackly Monestime
(74) *Attorney, Agent, or Firm*—Zagorin, O'Brien & Graham, LLP

(57) ABSTRACT

A computer system includes a memory for storing instructions executable by a processor and an on-chip trace memory having a plurality of locations for storing trace information that indicates execution flow in the processor. A trace access instruction provides for access to the on-chip trace memory on the processor. The trace access instruction can be a write instruction or a read instruction. Typically, both read and write to the trace memory is provided. The system also has the capability to trace on start or restart of an executable thread by providing to the processor an indication of which executable thread to trace via a debug port. That indicates to the processor to provide trace information when the executable thread starts. When execution of the executable thread starts, the processor places an identifier corresponding to the executable thread into the trace memory to indicate that subsequent entries placed into the trace memory are part of said executable thread. The processor may also provide an entry indicating when the thread stops executing.

36 Claims, 8 Drawing Sheets

U.S. PATENT DOCUMENTS

| | | | | |
|---|---|---|---|---|
| 4,462,077 | | 7/1984 | York | 364/300 |
| 4,598,364 | | 7/1986 | Gum et al. | 364/300 |
| 4,611,281 | * | 9/1986 | Suko et al. | 714/39 |
| 5,058,114 | | 10/1991 | Kuboki et al. | 371/19 |
| 5,321,828 | | 6/1994 | Phillips et al. | 395/500 |
| 5,345,580 | * | 9/1994 | Tamaru et al. | 395/500 |
| 5,357,626 | | 10/1994 | Johnson et al. | 395/500 |
| 5,371,689 | | 12/1994 | Tatsuma | 364/569 |
| 5,394,544 | | 2/1995 | Motoyama et al. | 395/575 |
| 5,446,876 | * | 8/1995 | Levine et al. | 714/47 |
| 5,469,571 | | 11/1995 | Bunnell | 395/700 |
| 5,488,688 | | 1/1996 | Gonzales et al. | 395/183.1 |
| 5,491,793 | | 2/1996 | Somasundaram et al. | 395/183.21 |
| 5,526,485 | | 6/1996 | Brodsky | 395/183.14 |
| 5,530,804 | | 6/1996 | Edgington et al. | 395/183.06 |
| 5,533,192 | | 7/1996 | Hawley et al. | 395/183.04 |
| 5,544,311 | | 8/1996 | Harenberg et al. | 395/183.16 |
| 5,594,903 | | 1/1997 | Bunnell et al. | 395/712 |
| 5,615,331 | | 3/1997 | Toorians et al. | 395/182.07 |
| 5,630,102 | | 5/1997 | Johnson et al. | 395/500 |
| 5,630,128 | * | 5/1997 | Farrell et al. | 709/4 |
| 5,634,046 | * | 5/1997 | Chatterjee et al. | 712/227 |
| 5,642,479 | | 6/1997 | Flynn | 395/183.21 |
| 5,678,003 | | 10/1997 | Brooks | 395/183.1 |
| 5,689,694 | * | 11/1997 | Funyu | 712/234 |
| 5,724,505 | | 3/1998 | Argade et al. | 395/183.21 |
| 5,740,440 | | 4/1998 | West | 395/704 |
| 5,751,942 | | 5/1998 | Christensen et al. | 395/183.14 |
| 5,752,013 | | 5/1998 | Christensen et al. | 395/568 |
| 5,764,885 | | 6/1998 | Sites et al. | 395/183.21 |
| 5,768,152 | | 6/1998 | Battaline et al. | 364/551.01 |
| 5,771,240 | | 6/1998 | Tobin et al. | 371/22.1 |
| 5,774,708 | | 6/1998 | Klingler | 395/568 |
| 5,802,272 | * | 9/1998 | Sites et al. | 714/45 |
| 5,812,811 | | 10/1998 | Dubey | 395/183.01 |
| 5,828,824 | | 10/1998 | Swoboda | 395/183.01 |
| 5,848,264 | | 12/1998 | Baird et al. | 395/500 |
| 5,867,644 | | 2/1999 | Ranson et al. | 395/183.15 |
| 5,889,981 | | 3/1999 | Betker et al. | 395/568 |
| 5,889,988 | * | 3/1999 | Held | 709/103 |
| 5,901,283 | * | 5/1999 | Kanzaki | 395/704 |
| 5,903,718 | | 5/1999 | Marik | 395/183.14 |
| 5,943,498 | | 8/1999 | Yano et al. | 395/704 |
| 5,953,530 | | 9/1999 | Rishi et al. | 395/704 |
| 5,978,902 | | 11/1999 | Mann | 712/227 |
| 5,978,937 | | 11/1999 | Miyamori et al. | 714/45 |
| 5,996,092 | | 11/1999 | Augsburg et al. | 714/38 |
| 6,009,270 | | 12/1999 | Mann | 395/704 |
| 6,041,406 | | 3/2000 | Mann | 712/227 |

OTHER PUBLICATIONS

K5 HDT, e–mail describing K5 HDT, Jan. 11, 1997, pp. 1–6.

Motorola "CPU32 Reference Manual", pp. 7–1 thru 7–13 (admitted prior to Apr. 8, 1997).

Motorola "MEVB Quick Start Guide", pp. 3–5 thru 7–2 (admitted prior to Apr. 8, 1997).

Revill, Geoff, "Advanced On–chip Debug for ColdFire Developers", Embedded System Engineering, Apr./May 1997, pp. S2–S4.

Larus, James R., Efficient Program Tracing, 8153 Computer, No. 5, May 26, 1993, Los Alamitos, CA, pp. 52–61.

Advanced Micro Devices, "Am29040™ Microprocessor User's Manual—29K Family", Advanced Micro Devices, Inc. 1994, pp. 12–1 through 12–26.

O'Farrell, Ray, "Choosing a Cross–Debugging Methodology", Embedded Systems Programming, Aug. 1997, pp. 84–89.

Ganssle, Jack G., "Vanishing Visibility, Part 2", Embedded Systems Programming, Aug. 1997, pp. 113–115.

Tornado, "The Next Generation of Embedded Development Tools (a Wind River Systems white paper)", Nov. 1997, pp. 1–15.

Geir, Jim, "A Kinder, Smaller Windows", BYTE Special Report, Aug. 1997, 103–107.

Mittag, Larry, "Windows CE—What's in it for You?", Embedded Systems Programming, Nov. 1997, pp. 20–22, 24, and 26–27.

Ojennes, Dan, "Debugging With Real–Time Trace", Embedded Systems Programming, Aug. 1997, pp. 50–52, 54, 56, and 58.

Levy, Markus, "Windows CE at the Center of a Juggling Act", EDN, Jul. 17, 1997, pp. 38, 40, 42, 44, 46, and 48–49.

Core, "A Real OS for Real Time", Sep. 1996, BYTE, pp. 51–52.

Core, "A RISC OS for All Seasons", Dec. 1996, BYTE, pp. 49–50.

Core, "Inferno: One Hot OS", Jun. 1997, BYTE, pp. 53–54.

Core, "A New Epoch for Hand–Helds", Oct. 1997, BYTE, pp. 45–46.

IBM Technical Disclosure Bulletin, "Trace Array", Vol. 35, No. 2, pp. Jul. 1992, 138–140.

* cited by examiner

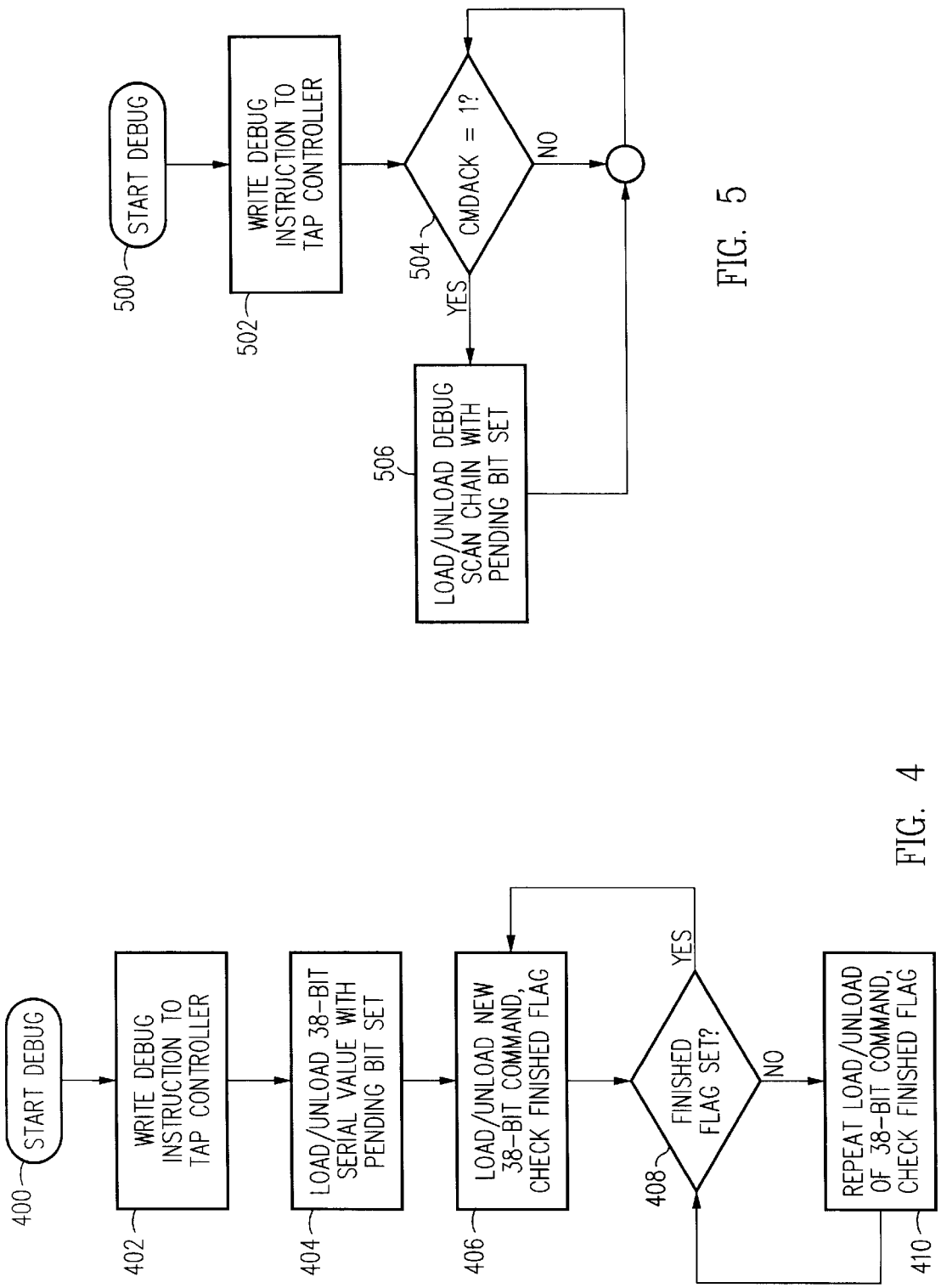

| 20 | | | | 15 | | | | | | | | | | | | | | | | 0 |
|---|---|---|---|---|---|---|---|---|---|---|---|---|---|---|---|---|---|---|---|---|
| 0 | 0 | 0 | 0 | 1 | B3 | B2 | B1 | 1 | 0 | 0 | 0 | 0 | 0 | 0 | 0 | 0 | 0 | 0 | 0 | 0 |
| TCODE=1 | | | | | Only 3-bits of BFIELD used | | | | | | | | | | | | | | | |

FIG. 6A

| 20 | 19 | 15 | 0 |
|---|---|---|---|
| 0 | TCODE=2 | TADDR_H, high 16-bits of EIP target logical address | |
| 0 | TCODE=7 | TADDR_L, low 16-bits of EIP target logical address | |

FIG. 6B

| 20 | 19 | 15 | 0 | | | |
|---|---|---|---|---|---|---|
| 0 | TCODE=8 | TADDR_H, high 16-bits of EIP stop instruction logical address | | | | |
| 0 | TCODE=7 | TADDR_L, low 16-bits of EIP stop instruction logical address | | | | |
| 0 | TCODE=4 | BADDR_H, high 16-bits of Current segment base address | | | | |
| 0 | TCODE=7 | BADDR_L, low bits 15-4 of segment base address | – | PG | SZ | R̄/P |

FIG. 6C

| 20 | 19 | 15 | 0 | | | |
|---|---|---|---|---|---|---|
| V | TCODE=1 | 1 | BFIELD | | | |
| 0 | TCODE=6 | TADDR_H, high 16-bits of EIP for interrupted instruction logical address | | | | |
| 0 | TCODE=7 | TADDR_L, low 16-bits of EIP for interrupted instruction logical address | | | | |
| 0 | TCODE=3 | BADDR_H, high 16-bits of previous segment base address | | | | |
| 0 | TCODE=7 | BADDR_L, low bits 15-4 of segment base address | – | PG | SZ | R̄/P |
| 0 | TCODE=5 | Vector number | | | | |
| 0 | TCODE=7 | TADDR_H, high 16-bits of interrupt handler logical address | | | | |
| 0 | TCODE=7 | TADDR_L, low 16-bits of instruction logical address | | | | |

FIG. 6D

| 20 | 19 | 15 | | 0 |
|---|---|---|---|---|
| V̄ | TCODE=1 | 1 | BFIELD | |
| 0 | TCODE=3 | BADDR_H, high 16-bits of previous segment base address | | |
| 0 | TCODE=7 | BADDR_L, low bits 15-4 of segment base address | - PG SZ | R̄/P |
| 0 | TCODE=2 | TADDR_H, high 16-bits of long-jump target logical address | | |
| 0 | TCODE=7 | TADDR_L, low 16-bits of long-jump target logical address | | |

FIG. 6E

| 20 | 19 | 15 | 0 |
|---|---|---|---|
| 0 | TCODE=9 | 16-bit value supplied by instruction | |

FIG. 6F

| 20 | 19 | 15 | 0 |
|---|---|---|---|
| 0 | TCODE=6 | TADDR_H, high 16-bits of EIP for current instruction logical address | |
| 0 | TCODE=7 | TADDR_L, low 16-bits of EIP for current instruction logical address | |

FIG. 6G

PROCESSOR HAVING A TRACE ACCESS INSTRUCTION TO ACCESS ON-CHIP TRACE MEMORY

RELATED APPLICATIONS

This application claims priority to U.S. application Ser. No. 60/043,070, filed Apr. 8, 1997, which is hereby incorporated by reference.

BACKGROUND OF THE INVENTION

1. Field of the Invention

The invention relates to debug support in operating systems, and more particularly to an operating system providing on-chip trace support.

2. Description of the Related Art

The availability of greater integration, lower costs, higher performance and product innovation has fueled rapid expansion of products based on embedded microprocessors. At the same time, the growth in software complexity, coupled with the increasing processor clock speeds, has placed an increasing burden on application software developers. The cost of developing and debugging new software products is now a significant factor in processor selection. In response, a tools industry has evolved to provide a range of often incompatible tools to satisfy hardware and software development requirements.

A processor's failure to adequately facilitate software debug results in longer customer development times and reduces the processor's attractiveness for use within industry. The need to provide software debug support is particularly acute within the embedded microprocessor industry, where specialized on-chip circuitry is often combined with a processor core.

In addition to the software engineer, other parties are also affected by the type and availability of debug tools or involved in their development. These parties include: the "trace" algorithm developer who must search through captured software trace data that reflects instruction execution flow in a processor; the in-circuit emulator hardware developer who deals with problems of signal synchronization, clock frequency and trace bandwidth; and the processor manufacturer who does not want a solution that results in increased processor cost or design and development complexity.

With desktop systems, complex multitasking operating systems are currently available to support debugging. However, the initial task of getting these operating systems running reliably often requires special development equipment. While not the standard in the desktop environment, the use of such equipment is often the approach taken within the embedded industry.

Traditionally, the most powerful piece of debug equipment available to an embedded project has been the in-circuit emulator (ICE). They are most frequently (but not exclusively) used during the early stages of "bringing up the hardware". In many cases ICE equipment is too expensive to be widely available to all project members. In fact typically only software engineers which are somewhat hardware-friendly have the necessary skills required to drive an ICE.

The availability of an ICE gives project engineers the confidence that they can rapidly resolve any difficult development problem they encounter. For this reason, many project teams insist that an ICE be available or they may select an alternative processor. Unfortunately, rising processor complexity, higher clock speeds, use of on-chip instruction and data cache and packaging problems have reduced the availability of ICE. All to often it is quite some time after a processor's introduction before an ICE becomes available, and only then if the processor is widely accepted.

In-circuit emulators do provide certain advantages over other debug environments by offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and slinking product life cycles.

Assuming full-function in-circuit emulation is required, there are several known processor manufacturing techniques able to offer the required support for emulation equipment. Most processors intended for personal computer (PC) systems utilize a multiplexed approach in which existing pins are multiplexed for use in software debug. This approach is not particularly desirable in the embedded industry, where it is more difficult to overload pin functionality.

Other more advanced processors multiplex debug pins in time. In such processors, the address bus is used to report software trace information during a BTA-(Branch Target Address) cycle. The BTA-cycle, however, must be stolen from the regular bus operation. In debug environments where branch activity is high and cache hit rates are low, it becomes impossible to hide the BTA-cycles. The resulting conflict over access to the address bus necessitates processor "throttle back" to prevent loss of instruction trace information. In the communications industry, for example, software typically makes extensive use of branching and suffers poor cache utilization, often resulting in 20% throttle back or more. That amount of throttle back is an unacceptable amount for embedded products which must accommodate real-time constraints.

In another approach, a second "trace" or "slave" processor is combined with the main processor, with the two processors operating in-step. Only the main processor is required to fetch instructions. The second, slave processor is used to monitor the fetched instructions on the data bus and keeps its internal state in synchronization with the main processor. The address bus of the slave processor functions to provide trace information. After power-up, via a JTAG (Joint Test Action Group) input, the second processor is switched into a slave mode of operation. Free from the need to fetch instructions, its address bus and other pins provide the necessary trace information.

Another existing approach involves building debug support into every processor, but only bonding-out the necessary signal pins to support e.g., trace capability, in a limited number of packages. These specially packaged versions of the processor are used during debug and replaced with the smaller package for final production. That bond-out approach suffers from the need to support additional bond pad sites in all fabricated devices. That can be a burden in small packages and pad limited designs, particularly if a substantial number of extra pins are required by the debug support variant. Additionally, the debug capability of the specially packaged processors is unavailable in typical processor-based production systems.

The rising cost of ICE and the increase in its unavailability has lead to a search for alternatives. The use of general purpose logic analyzers, with support software, has provided one alternative. However, these tool combinations are generally considered even harder to drive than ICE. The primary reason engineers select an ICE solution is because of its program trace capability. The trace capability of a logic analyzer is the reason engineers resort to their use when an ICE is unavailable.

In yet another debug approach (the "Background Debug Mode" by Motorola, Inc.) limited on-chip debug circuitry is provided for basic run control. Through a dedicated serial link requiring additional pins, this approach allows a debugger to start and stop the target system and apply basic code breakpoints by inserting special instructions in system memory. Once halted, special commands are used to inspect memory variables and register contents.

Typically a project engineer will utilize a ROM monitor when an ICE solution is too expensive or unavailable. These monitors consist of relatively small programs which are located in the target system's ROM or Flash memory. They also typically have a small RAM requirement The monitor program supports control and visibility into the program's register and memory contents, but no trace of program execution. Often projects will be supported with one or two ICEs, with the rest of the software engineers working with a target monitor.

An additional tool available to the embedded project is the ROM emulator. This enables system ROM or RAM to be replaced with a dual ported memory which can be accessed by both the target and host processors. The use of a ROM emulator does provide for fast data and program transfer, which is the primary reason for its selection.

The low cost of ROM monitors make them popular, but their use has several drawbacks: They require ROM and RAM resources to be reserved within the target systems memory. They require an on-chip or off-chip peripheral, such as a Universal Asynchronous Receiver Transmitter (UART), to support communication with the controlling (host) platform. Subsequent updating of the monitor program is often an arduous process.

In recent years there has been greater use of sophisticated tools such as multitasking operating systems, library resources and source-level debuggers, to name only a few. As discussed, complex multi-tasking operating systems are currently available to support debugging with desktop systems. In general, tools for use with PC software development have reached a high level of functionality and simplicity of use. That has not gone unnoticed by engineers in the embedded industry, and there is now a demand for a similar level of tool capability.

Several studies have shown that presently only about 50% of 32-bit embedded systems make use of a multitasking operating systems although this number is growing. One deterrent to use of multitasking operating systems has certainly been cost, but more important has been the perceived complexities of getting the system running. Often there are difficult tool transitions required as debugging proceeds from kernel-mode to application-mode debug. There is also the burden of often having to first get a ROM monitor running before commencing kernel and driver configuration for the particular system.

Thus, the current solutions for software debugging suffer from a variety of limitations, including: increased packaging and development costs, circuit complexity and processor throttle back. Further, there is currently no adequate low-cost procedure for providing trace information. Also, debugging embedded applications utilizing multi-tasking operating systems can result in difficult tool transitions from kernel to application debug. The limitations of the existing solutions are likely to be exacerbated in the future as internal processor clock frequencies continue to increase, software complexity continues to grow and expensive ICE solutions become more and more prohibitive.

SUMMARY OF THE INVENTION

Accordingly, the invention provides a method of operating a computer system that includes a memory for storing instructions executable by a processor. The method includes executing a trace access instruction stored in the memory to access an on-chip trace memory on the processor. The trace memory has a plurality of locations for storing trace information that indicates execution flow of a plurality of instructions in the processor. The trace access instruction can be a write instruction or a read instruction. Typically, both read and write to the trace memory is provided. The method further provides the capability to trace on execution of an executable thread by providing to the processor an indication to trace on execution of an executable thread. That indicates to the processor to provide trace information when the executable thread executes. When execution of the executable thread starts the; processor places an identifier corresponding to the executable thread into the trace memory to indicate that subsequent entries placed into the trace memory are part of the executable thread. The processor may also provide an entry indicating when the thread stops executing.

In still another embodiment, the method provides storing data in the trace memory prior to the access instruction according to the privilege level of the code being executed. When an application task is executing with a first privilege level, trace information is loaded into the trace memory. When a task starts to execute with a different privilege level, e.g. a system task, the processor stops providing trace information to the trace memory.

Another embodiment of the invention provides a computer program embodied on computer readable media, for execution on a computer system including a processor, the processor including an on-chip trace memory, and a memory for storing instructions executable by the processor. The computer program includes a trace access instruction for accessing the trace memory on the processor which has a plurality of locations for storing trace information indicative of instruction execution flow in the processor. The trace access instruction may be a write or read.

In another embodiment of the invention, a method is provided for operating a computer system that includes a processor and a memory storing instructions for the processor. The method includes identifying an executable thread to trace as a first trace condition. In response to the identifying step, an indicator is stored that the executable thread is to be traced. Additional trace information is provided indicating when to enable tracing instruction execution flow within the executable thread. The additional trace information is a second trace condition. Trace information is provided when the first and second trace conditions are both true.

In another embodiment of the invention, an operating system includes a trace handling component. The operating system is for execution on a computer system that includes a processor and memory for storing instructions executable by the processor. The trace handling component includes a trace read instruction for accessing an on-chip trace memory on the processor. The trace read instruction is stored in the instruction memory. The trace memory has a plurality of locations for storing trace information indicative of instruction execution flow in the processor. The operating system also includes a trace write instruction. The write instruction writes data identified by the trace write instruction to one of the locations in the trace memory.

BRIEF DESCRIPTION OF THE DRAWINGS

A better understanding of the present invention can be obtained when the following detailed description of the preferred embodiment is considered in conjunction with the following drawings, in which:

FIG. 4 is a flowchart illustrating software debug command passing according to one embodiment of the invention;

FIG. 5 is a flowchart illustrating enhanced software port command passing according to a second embodiment of the invention;

FIGS. 6A–6G illustrate the general format of a variety of trace cache entries for reporting instruction execution according to the invention.

DESCRIPTION OF THE PREFERRED EMBODIMENT(S)

Figure 1:
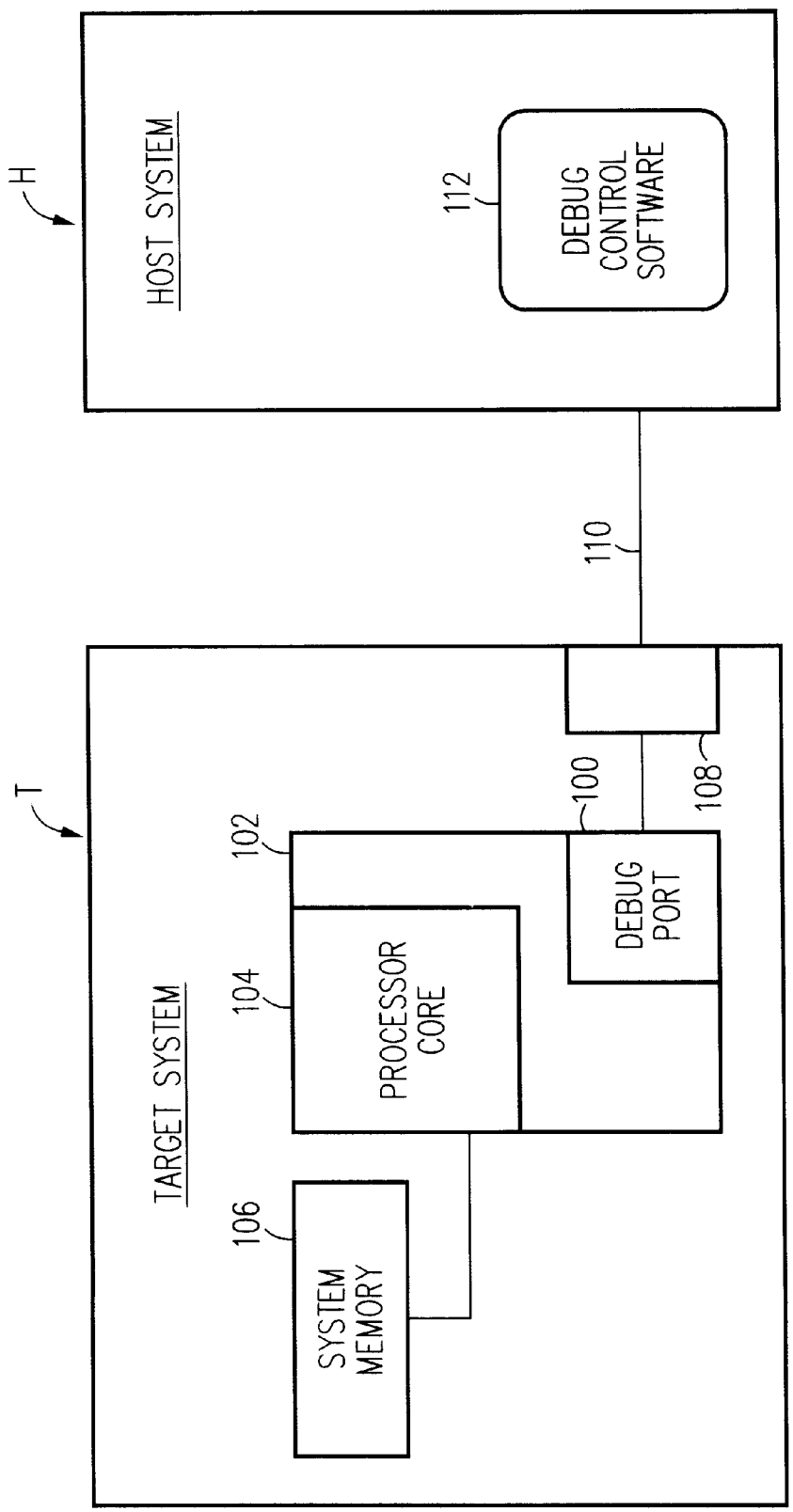
FIG. 1 is a block diagram of a software debug environment utilizing a software debug solution in accordance with the present invention.

Turning now to the drawings, FIG. 1 depicts an exemplary software debug environment illustrating a contemplated use of the present invention. A target system T is shown containing an embedded processor device 102 according to the present invention coupled to system memory 106. The embedded processor device 102 incorporates a processor core 104, an instruction trace memory (also referred to herein as trace cache 200) (FIG. 2), and a debug port 100. Although not considered critical to the invention, the embedded processor 102 may incorporate additional circuitry (not shown) for performing application specific functions, or may take the form of a stand-alone processor or digital signal processor. Preferably, the debug port 100 uses an IEEE-1149.1-1990 compliant JTAG interface or other similar standardized serial port interface.

A host system H is used to execute debug control software 112 for transferring high-level commands and controlling the extraction and analysis of debug information generated by the target system T. The host system H and target system T of the disclosed embodiment of the invention communicate via a serial link 110. Most computers are equipped with a serial or parallel interface which can be inexpensively connected to the debug port 100 by means of a serial connector 108, allowing a variety of computers to function as a host system H. Alternatively, the serial connector 108 could be replaced with higher speed JTAG-to-network conversion equipment. Further, the target system T can be configured to analyze debug/trace information internally.

Figure 2:
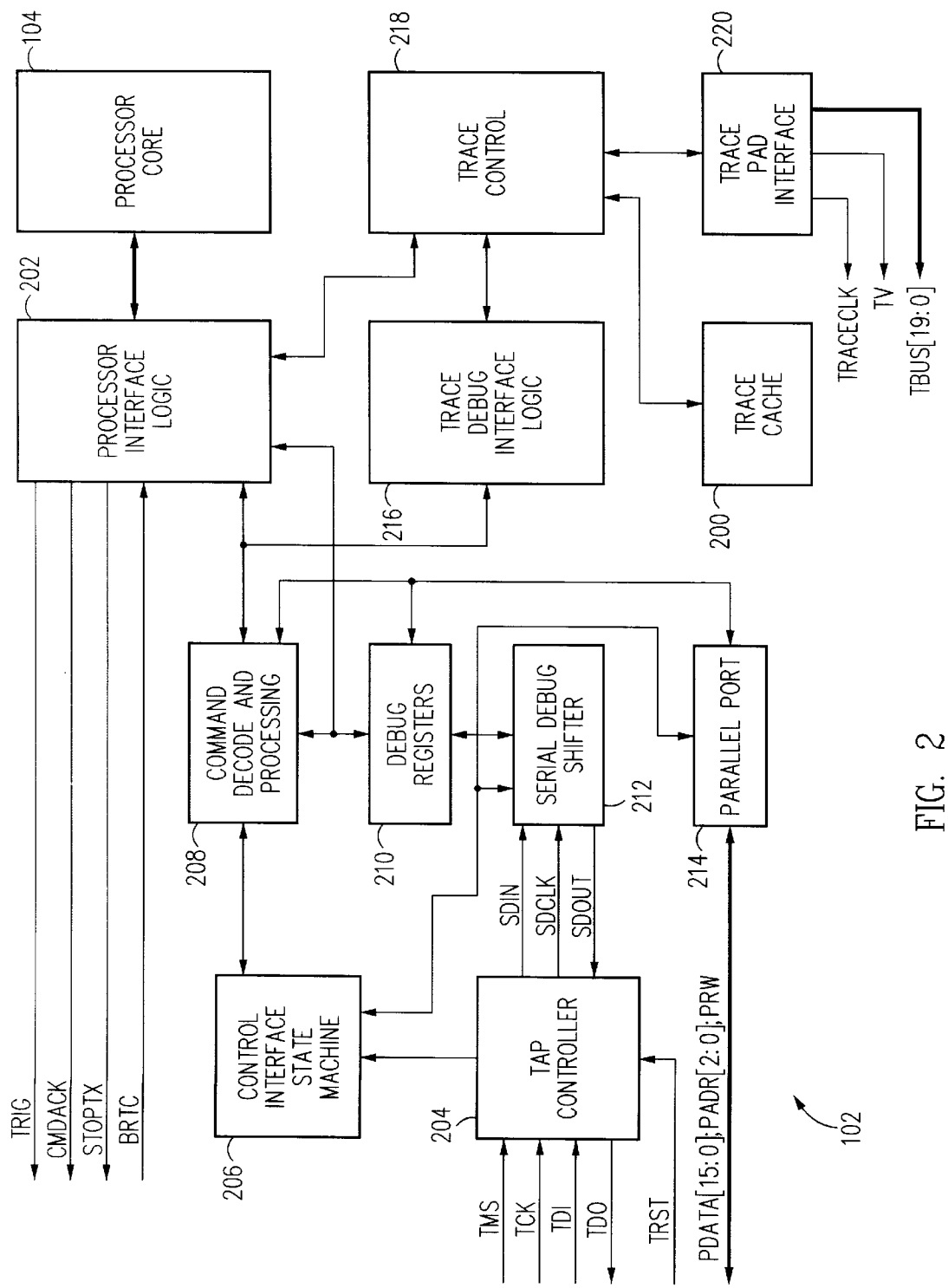
FIG. 2 is a block diagram providing details of an exemplary embedded processor product incorporating an on-chip instruction trace cache according to the present invention.

Referring now to FIG. 2, details of an embedded processor device 102 according to the present invention are provided. In addition to the processor core 104, FIG. 2 depicts various elements of an enhanced embodiment of the debug port 100 capable of utilizing and controlling the trace memory (also referred to herein as trace cache) 200. Many other configurations are possible, as will become apparent to those skilled in the art, and the various processor device 102 components described below are shown for purposes of illustrating the benefits associated with providing an on-chip trace cache 200.

Of significance to the disclosed embodiment of the invention, the trace control circuitry 218 and trace cache 200 operate to provide trace information for reconstructing instruction execution flow in the processor core 104. The trace control circuitry 218 supports "tracing" to a trace pad interface port 220 or to the instruction trace cache 200 and provides user control for selectively activating instruction trace capture. Other features enabled by the trace control circuitry 218 include programnability of synchronization address generation and user specified trace records, as discussed in greater detail below. The trace control circuitry 218 also controls a trace pad interface port 220. When utilized, the trace pad interface port 220 is capable of providing trace data while the processor core 104 is executing instructions, although clock synchronization and other issues may arise. The instruction trace cache 200 addresses many of these issues, improving bandwidth matching and alleviating the need to incorporate throttle-back circuitry in the processor core 104.

At a minimum, only the conventional JTAG pins need be supported in the software debug port 100 in the described embodiment of the invention. The JTAG pins essentially become a transportation mechanism, using existing pins, to enter commands to be performed by the processor core 104. More specifically, the test clock signal TCK, the test mode select signal TMS, the test data input signal TDI and the test data output signal TDO provided to and driven by the JTAG Test Access Port (TAP) controller 204 are conventional JTAG support signals and known to those skilled in the art. As discussed in more detail below, an "enhanced" embodiment of the debug port 100 adds the command acknowledge signal CMDACK, the break request/trace capture signal BRTC, the stop transmit signal STOPTX, and the trigger signal TRIG to the standard JTAG interface. The additional signals allow for pinpoint accuracy of external breakpoint assertion and monitoring, triggering of external devices in response to internal breakpoints, and elimination of status polling of the JTAG serial interface. These "sideband" signals offer extra functionality and improve communications speeds for the debug port 100. These signals also aid in the operation of an optional parallel port 214 provided on special bond-out versions of the disclosed embedded processor device 102.

Via the conventional JTAG signals, the JTAG TAP controller 204 accepts standard JTAG serial data and control. When a DEBUG instruction has been written to the JTAG instruction register, a serial debug shifter 212 is connected to the JTAG test data input signal TDI and test data output signal TDO, such that commands and data can then be loaded into and read from debug registers 210. In the disclosed embodiment of the invention, the debug registers 210 include two debug registers for transmitting (TX_DATA register) and receiving (RX_DATA register) data, an instruction trace configuration register (ITCR), and a debug control status register (DCSR).

A control interface state machine 206 coordinates the loading/reading of data to/from the serial debug shifter 212 and the debug registers 210. A command decode and processing block 208 decodes commands/data and dispatches them to processor interface logic 202 and trace debug interface logic 216. In addition to performing other functions, the trace debug interface logic 216 and trace control logic 218 coordinate the communication of trace information from the trace cache 200 to the TAP controller 204. The processor interface logic 202 communicates directly with the processor core 104, as well as the trace control logic 218. As described more fully below, parallel port logic 214 communicates with a control interface state machine 206 and the debug registers 210 to perform parallel data read/write operations in optional bond-out versions of the embedded processor device 102.

Before debug information is communicated via the debug port 100 using only conventional JTAG signals, the port 100 is enabled by writing the public JTAG instruction DEBUG into a JTAG instruction register contained within the TAP controller 204. As in Table 1, the JTAG instruction register of the disclosed embodiment is a 38-bit register comprising a 32-bit data field (debug_data{31:0}), a four-bit command field to point to various internal registers and functions provided by the debug port 100, a command pending flag, and a command finished flag. It is possible for some commands to use bits from the debug_data field as a subfield to extend the number of available commands.

TABLE 1

| 37 | 5 | 2 | 1 | 0 |
|---|---|---|---|---|
| debug_data | command | | P | F |

This JTAG instruction register is selected by toggling the test mode select signal TMS. The test mode select signal TMS allows the JTAG path of clocking to be changed in the scan path, enabling multiple paths of varying lengths to be used. Preferably, the JTAG instruction register is accessible via a short path. This register is configured to include a soft register for holding values to be loaded into or received from specified system registers.

Figure 3:
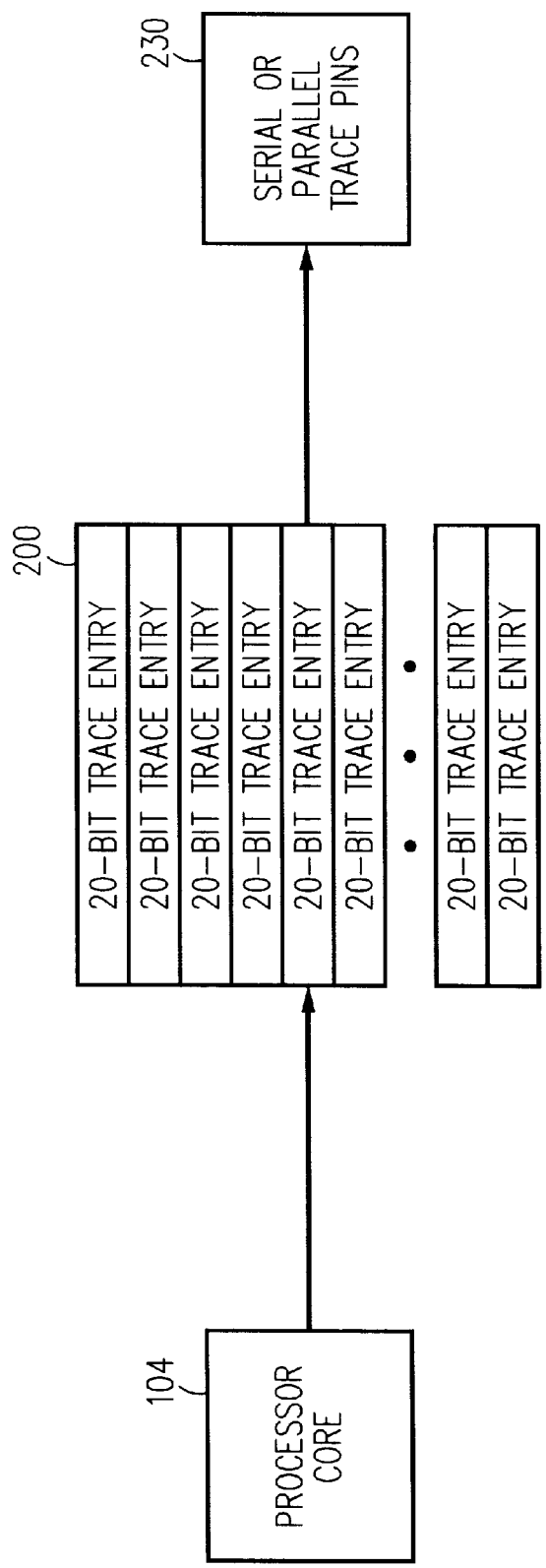
FIG. 3 is a simplified block diagram depicting the relationship between an exemplary instruction trace cache and other components of an embedded processor product according to the present invention.

Referring now to FIG. 3, a simplified block diagram depicting the relationship between an exemplary instruction trace cache 200 and other components of an embedded processor device 102 according to the present invention is shown. In one contemplated embodiment of the invention, the trace cache 200 is a 128 entry first-in, first-out (FIFO) circular cache that records the most recent trace entries. Increasing the size of the trace cache 200 increases the amount of instruction trace information that can be captured, although the amount of required silicon area may increase.

As described in more detail below, the trace cache 200 of the disclosed embodiment of the invention stores a plurality of 20-bit (or more) trace entries indicative of the order in which instructions are executed by the processor core 104. Other information, such as task identifiers and trace capture stop/start information, can also be placed in the trace cache 200. The contents of the trace cache 200 are provided to external hardware, such as the host system H, via either serial or parallel trace pins 230. Alternatively, the target system T can be configured to examine the contents of the trace cache 200 internally.

FIG. 4 provides a high-level flow chart of command passing when using a standard JTAG interface. Upon entering debug mode in step 400 the DEBUG instruction is written to the TAP controller 204 in step 402. Next, step 404, the 38-bit serial value is shifted in as a whole, with the command pending flag set and desired data (if applicable, otherwise zero) in the data field. Control proceeds to step 406 where the pending command is loaded/unloaded and the command finished flag checked. Completion of a command typically involves transferring a value between a data register and a processor register or memory/IO location. After the command has been completed, the processor 104 clears the command pending flag and sets the command finished flag, at the same time storing a value in the data field if applicable. The entire 38-bit register is shifted out to the host to monitor the command finished and command pending flags. If the pending flag is reset to zero and the finished flag is set to one, the previous command has finished. The status of the flags is captured by the control interface state machine 206. A slave copy of the flags' status is saved internally to determine if the next instruction should be loaded. The slave copy is maintained due to the possibility of a change in flag status between TAP controller 204 states. This allows the processor 104 to determine if the previous instruction has finished before loading the next instruction.

If the finished flag is not set as determined in step 408, control proceeds to step 410 and the loading/unloading of the 38-bit command is repeated. The command finished flag is also checked. Control then returns to step 408. If the finished flag is set as determined in step 408, control returns to step 406 for processing of the next command. DEBUG mode is exited via a typical JTAG process.

Returning to FIG. 2, the aforementioned optional sideband signals are utilized in the enhanced debug port 100 to provide extra functionality. The optional sideband signals include a break request/trace capture signal BRTC that can function as a break request signal or a trace capture enable signal depending on the status of bit set in the debug control/status register. If the break request/trace capture signal BRTC is set to function as a break request signal, it is asserted to cause the processor 104 to enter debug mode (the processor 104 can also be stopped by scanning in a halt command via the convention JTAG signals). If set to function as a trace capture enable signal, asserting the break request/trace capture signal BRTC enables trace capture. Deasserting the signal turns trace capture off. The signal takes effect on the next instruction boundary after it is detected and is synchronized with the internal processor clock. The break request/trace capture signal BRTC may be asserted at any time.

The trigger signal TRIG is configured to pulse whenever an internal processor breakpoint has been asserted. The trigger signal TRIG may be used to trigger an external capturing device such as a logic analyzer, and is synchronized with the trace record capture clock signal TRACECLK. When a breakpoint is generated, the event is synchronized with the trace capture clock signal TRACECLK, after which the trigger signal TRIG is held active for the duration of trace capture.

The stop transmit signal STOPTX is asserted when the processor 104 has entered DEBUG mode and is ready for register interrogation/modification, memory or I/O reads and writes through the debug port 100. In the disclosed embodiment of the invention, the stop transmit signal STOPTX reflects the state of a bit in the debug control status register (DCSR). The stop transmit signal STOPTX is synchronous with the trace capture clock signal TRACECLK.

The command acknowledge signal CMDACK is described in conjunction with FIG. 5, which shows simplified command passing in the enhanced debug port 100 of FIG. 2. Again, to place the target system T into DEBUG mode, a DEBUG instruction is written to the TAP controller 204 in step 502. Control proceeds to step 504 and the command acknowledge signal CMDACK is monitored by the host system H to determine command completion status. This signal is asserted high by the target system T simultaneously with the command finished flag and remains high until the next shift cycle begins. When using the command acknowledge signal CMDACK, it is not necessary to shift out the JTAG instruction register to capture the command finished flag status. The command acknowledge signal CMDACK transitions high on the next rising edge of the test clock signal TCK after the command finished flag has changed from zero to one. When using the enhanced JTAG signals, a new shift sequence (step 506) is not started by the host system H until the command acknowledge signal CMDACK pin has been asserted high. The command acknowledge signal CMDACK is synchronous with the test clock signal TCK. The test clock signal TCK need not be clocked at all times, but is ideally clocked continuously when waiting for a command acknowledge signal CMDACK response.

Also included in debug register block 210 is an instruction trace configuration register (ITCR) shown in Table 2. This 32-bit register provides for the enabling/disabling and configuration of instruction trace debug functions. Numerous such functions are contemplated, including various levels of tracing, trace synchronization force counts, trace initialization, instruction tracing modes, clock divider ratio information, as well as additional functions shown in the following table. The ITCR is accessed through a JTAG instruction register write/read command as is the case with the other registers of the debug register block 210, or via a reserved instruction.

TABLE 2

| BIT | SYMBOL | DESCRIPTION/FUNCTION |
|---|---|---|
| 31:30 | Reserved | Reserved |
| 29 | RXINTEN | Enables interrupt when RX bit is set |
| 28 | TXINTEN | Enables interrupt when TX bit is set |
| 27 | TX | Indicates that the target system T is ready to transmit data to the host system H and the data is available in the TX_DATA register |
| 26 | RX | Indicates that data has been received from the host and placed in the RX_DATA register |
| 25 | DISL1TR | Disables level 1 tracing |
| 24 | DISL0TR | Disables level 0 tracing |
| 23 | DISCSB | Disables current segment base trace record |
| 22:16 | TSYNC{6:0} | Sets the maximum number of Branch Sequence trace records that may be output by the trace control block 218 before a synchronizing address record is forced |
| 15 | TSR3 | Bits 15:8 allow the user to map four breakpoint register as trace control breakpoints. Sets or clears trace mode on DR3 trap |
| 14 | TSR2 | Sets or clears trace mode on DR2 trap |
| 13 | TSR1 | Sets or clears trace mode on DR1 trap |
| 12 | TSR0 | Sets or clears trace mode on DR0 trap |
| 11 | TRACE3 | Enables Trace mode toggling using DR3 |
| 10 | TRACE2 | Enables Trace mode toggling using DR2 |
| 9 | TRACE1 | Enables Trace mode toggling using DR1 |
| 8 | TRACE0 | Enables Trace mode toggling using DR0 |
| 7 | TRON | Trace on/off |
| 6:4 | TCLK{2:0} | Encoded divider ratio between internal processor clock and TRACECLK |

TABLE 2-continued

| BIT | SYMBOL | DESCRIPTION/FUNCTION |
|---|---|---|
| 3 | ITM | Sets internal or external (bond-out) instruction tracing mode. In internal trace configuration, the trace buffer behaves as a circular buffer; in external trace mode the trace records are continuously sent out through the parallel trace port 220 while the core executing |
| 2 | TINIT | Trace initialization |
| 1 | TRIGEN | Enables pulsing of external trigger signal TRIG following receipt of any legacy debug breakpoint; independent of the Debug Trap Enable function in the DCSR |
| 0 | GTEN | Global enable for instruction tracing through the internal trace buffer or via the external (bond-out) interface |

Another debug register, the debug control/status register (DCSR) shown in Table 3, provides an indication of when the processor 104 has entered debug mode and allows the processor 104 to be forced into DEBUG mode through the enhanced JTAG interface. As shown in the following table, the DCSR also enables miscellaneous control features, such as: forcing a ready signal to the processor 104, controlling memory access space for accesses initiated through the debug port, disabling cache flush on entry to the DEBUG mode, the TX and RX bits, the parallel port 214 enable, forced breaks, forced global reset, and other functions. The ordering or presence of the various bits in either the ITCR or DCSR is not considered critical to the operation of the invention.

TABLE 3

| BIT | SYMBOL | DESCRIPTION/FUNCTION |
|---|---|---|
| 31:12 | Reserved | Reserved |
| 11 | TX | Indicates that the target system T is ready to transmit data to the host system H and the data is available in the TX_DATA register |
| 10 | RX | Indicates that data has been received from the host and placed in the RX_DATA register |
| 9 | DISFLUSH | Disables cache flush on entry to DEBUG mode |
| 8 | SMMSP | Controls memory access space (normal memory space/ system management mode memory) for accesses initiated through the Debug Port 100 |
| 7 | STOP | Indicates whether the processor 104 is in DEBUG mode (equivalent to stop transmit signal STOPTX |
| 6 | FRCRDY | Forces the ready signal RDY to the processor 104 to be pulsed for one processor clock; useful when it is apparent that the processor 104 is stalled waiting for a ready signal from a non-responding device |
| 5 | BRKMODE | Selects the function of the break request/trace capture signal BRTC (break request or trace capture on/off) |
| 4 | DBTEN | Enables entry to debug mode or toggle trace mode enable on a trap/fault via processor 104 registers DR0–DR7 or other legacy debug trap/fault mechanisms |

TABLE 3-continued

| BIT | SYMBOL | DESCRIPTION/FUNCTION |
|---|---|---|
| 3 | PARENB | Enables parallel port 214 |
| 2 | DSPC | Disables stopping of internal processor clocks in the Halt and Stop Grant states |
| 1 | FBRK | Forces processor 104 into DBBUG mode at the next instruction boundary (equivalent to pulsing the external BRTC pin) |
| 0 | FRESET | Forces global reset |

When in cross debug environment such as that of FIG. 1, it is necessary for the parent task running on the target system T to send information to the host platform H controlling it. This data may consist, for example, of a character stream from a prinif( ) call or register information from a Task's Control Block (TCB). One contemplated method for transferring the data is for the operating system to place the data in a known region, then via a trap instruction, cause DEBUG mode to be entered.

Via debug port 100 commands, the host system H can then determine the reason that DEBUG mode was entered, and respond by retrieving the data from the reserved region. However, while the processor 104 is in DEBUG mode, normal processor execution is stopped. As noted above, this is undesirable for many real-time systems.

This situation is addressed according to the present invention by providing two debug registers in the debug port 100 for transmitting (DX_DATA register) and receiving (RX_DATA register) data. These registers can be accessed using the soft address and JTAG instruction register commands. As noted, after the host system H has written a debug instruction to the JTAG instruction register, the serial debug shifter 212 is coupled to the test data input signal TDI line and test data output signal TDO line.

When the processor 104 executes code causing it to transmit data, it first tests a TX bit in the ITCR. If the TX bit is set to zero then the processor 104 executes a processor instruction (either a memory or I/O write) to transfer the data to the TX_DATA register. The debug port 100 sets the TX bit in the DCSR and ITCR, indicating to the host system H that it is ready to transmit data. Also, the STOPTX pin is set high. After the host system H completes reading the transmit data from the TX_DATA register, the TX bit is set to zero. A TXINTEN bit in the ITCR is then set to generate a signal to interrupt the processor 104. The interrupt is generated only when the TX bit in the ITCR transitions to zero. When the TXINTEN bit is not set, the processor 104 polls the ITCR to determine the status of the TX bit to further transmit data.

When the host system H desires to send data, it first tests a RX bit in the ITCR. If the RX bit is set to zero, the host system H writes the data to the RX_DATA register and the RX bit is set to one in both the DCSR and ITCR. A RXINT bit is then set in the ITCR to generate a signal to interrupt the processor 104. This interrupt is only generated when the RX in the ITCR transitions to one. When the RXINTEN bit is not set, the processor 104 polls the ITCR to verify the status of the RX bit. If the RX bit is set to one, the processor instruction is executed to read data from the RX_DATA register. After the data is read by the processor 104 from the RX_DATA register the RX bit is set to zero. The host system H continuously reads the ITCR to determine the status of the RX bit to further send data.

This technique enables an operating system or application to communicate with the host system H without stopping processor 104 execution. Communication is conveniently achieved via the debug port 100 with minimal impact to on-chip application resources. In some cases it is necessary to disable system interrupts. This requires that the RX and TX bits be examined by the processor 100. In this situation, the communication link is driven in a polled mode.

Some embedded systems require instruction trace to be examined while maintaining I/O and data processing operations. A bond-out version of the embedded processor device 102 may therefore be preferable to provide the trace data.

Thus, in the disclosed embodiment of the invention, an optional bond-out version of the embedded processor device 102 is provided in which a communication port is provided that can be selected as a parallel debug port or a trace port. The parallel debug port is a high performance port 214 which physically shares a substantial number of the bond-out pads utilized by the instruction trace port 220. The trace port 220 provides external trace capability while the parallel debug port 214 provides parallel command and data access to the debug port 100. The input/output terminals of the bond-out port are shown in Table 4. Some of the pins of the bond-out port are exclusive to the parallel port, some are exclusive to the trace port and the remainder shared. In the embodiment shown, 20 bits are shared (PDATA, PADR and PRW). When the port is selected as a debug port, the TCK is used to synchronize all data transactions. TCK should be continually clocked when the parallel debug interface is enabled. When the port is selected as a trace port, the TRACECLK is provided to synchronize the output data.

The parallel port 214 provides a 16-bit wide bidirectional data bus (PDATA{15:0}), a 3-bit address bus (PADR{2:0}), a parallel debug port read/write select signal (PRW). In addition the bond out port includes a trace valid signal TV and an instruction trace record output clock TRACECLK utilized when the port is being used as a trace port. Although not shared with the trace interface port 220, a parallel bus request/grant signal pair PBREQ/PBGNT are also provided.

TABLE 4

| Name | I/O | Resistor | Sync Clock | Description |
|---|---|---|---|---|
| TRACECLK | Output | — | — | Instruction Trace record output clock |
| TV | Output | PD | TRACECLK | 0 = Valid trace record, 1 = no trace record This pin not shared with parallel bus interface |
| PDATA[15:0] | Bidi | PD | TCK/ TRACECLK | Parallel debug port data path. Shared with pins TBUS[15:0] |
| PADR[2:0] | Bidi | PD | TCK/ TRACECLK | Parallel debug port address. Shared with pins TBUS[18:16] |
| PRW | Bidi | PD | TCK/ TRACECLK | Parallel debug port read/write select. Shared with TBUS[19] pin 1 = Perform a parallel read from the serial debug register 0 = Perform a parallel |

TABLE 4-continued

| Name | I/O | Resistor | Sync Clock | Description |
|---|---|---|---|---|
| PBREQ | Output | | TCK | write to the serial debug register<br>1 = Request Host to enable parallel bus interface<br>0 = Request Host to disable parallel bus interface<br>This pin not shared with trace bus interface |
| PBGNT | Input | PD | TCK | 1 = Host has enabled parallel bus interface<br>0 = Host has disabled parallel bus interface<br>This pin not shared with trace bus interface |

The parallel port 214 provides for fast downloads/uploads to and from target system T memory. The parallel port 214 may be used for all debug communications with the target system T whenever the processor 104 is stopped. The serial debug signals (standard or enhanced) are used for debug access to the target system T when the processor 104 is executing instructions.

In a similar manner to the JTAG standard, all inputs to the parallel port 214 are sampled on the rising edge of the test clock signal TCK, and all outputs are changed on the falling edge of the test clock signal TCK. In the disclosed embodiment, parallel commands are initiated only while the processor 104 is stopped and the external trace interface 220 is disconnected from the shared bus. Any transaction started on the parallel port must complete on the parallel port. Similarly, any transaction begun on the serial port completes there.

The parallel bus request signal PBREQ and parallel bus grant signal PBGNT are provided to expedite multiplexing of the shared bus signals between the trace cache 200 and the parallel port 214. When the host interface to the parallel port 214 determines that the parallel bus request signal PBREQ is asserted, it begins driving the parallel port 214 signals and asserts the parallel bus grant signal PBGNT.

The serial/parallel debug command register uses a 4-bit command field to point to the various internal registers and functions provided in the debug interface. The command register is accessible only via the serial/parallel debug interface in the illustrated embodiment. Some of the commands use bits from the debug_data field as a sub-field to extend the number of available commands. Table 7 provides the available commands in one embodiment.

TABLE 5

| Command Code | Definition |
|---|---|
| 0000 | Null (not recognized by hardware, Finished flag not set) |
| 0001 | Load Soft Address register |

TABLE 5-continued

| Command Code | Definition |
|---|---|
| 0010 | general register read |
| 0011 | general register write |
| 0100 | Serial/parallel Debug register read |
| 0101 | Serial/parallel Debug register write |
| 0110 | reserved |
| 0111 | Misc. Serial/parallel Debug functions per debug_data[3:0]<br>0 exit via RESET (hard reset)<br>1 exit via SRESET (soft reset)<br>2 Instruction step (may destroy soft address) Bit 7 of the Debug Control/Status register or the external STOPTX pin should be monitored to determine when the instruction step is completed. Unlike the TF bit, this command will step into interrupts.<br>3 peripheral reset (CPU not reset)<br>4 Read trace buffer at displacement given in [soft address]<br>5 exit to instruction at EIP<br>all null<br>others |
| 1000 | 8-bit memory write to [soft address] |
| 1001 | 16-bit memory write to [soft address] |
| 1010 | 32-bit memory write to [soft address] |
| 1011 | 8-bit output to [soft address] (I/O cycle) |
| 1100 | 16-bit output to [soft address] (I/O cycle) |
| 1101 | 32-bit output to [soft address] (I/O cycle) |
| 1110 | Input or read per debug_data [3:0]<br>0 8-bit read from [soft_address]<br>1 16-bit read from [soft_address]<br>2 32-bit read from [soft_address]<br>3 8-bit input from [soft_address] (I/O cycle)<br>4 16-bit input from [soft_address] (I/O cycle)<br>5 32-bit input from [soft_address] (I/O cycle)<br>all null<br>others |
| 1111 | read/write save/restore data |

A brief description of some of the more basic commands follows. A load soft address register command places a new 32-bit value for soft address pointer in the debug_data field{31:0} together with the command code and the pending bit. The debug logic transfers the data to the Soft Address register and asserts the finished flag and CMDACK signal on completion.

Memory or I/O read and write commands require the soft address register to set up the address/port before hand. For a read, the read data is transferred directly to the debug_data register when the finished flag/CMDACK pin is set. For a write, the data is supplied in the debug_data register along with the command in the debug command register. The address is post incremented by the appropriate size for any read/write transfer to allow block transfers to be done without continually setting up the soft address register. On memory accesses on a microcontroller with multiple physical memory spaces, the appropriate chipset mapping registers should be set up beforehand. Memory accesses occur as data accesses. The memory access can be directed to either normal memory space of System Management Mode (SMM) space based on the setting of the SMMSP bit in the DSCR.

The register read instruction utilizes the register address supplied to the debug_data register via a write command along with the command in the debug command register. The address is transferred to the soft address register to simplify read/modify/write settings of individual bits, and the read register contents are transferred directly to the debug_data register when the finished flag/CMDACK pin is set.

The register write command uses the soft address register to hold the target register write address. The data to be written is supplied in the debug_data register along with the appropriate write command in the debug command register.

Registers accessible through the debug ports in an exemplary embodiment of the invention having an X86 architecture are shown in Table 6.

TABLE 6

| Soft address | Name | Size | Description |
|---|---|---|---|
| 0 | CR0 | [31:0] | Control reg. 0 |
| 1 | CR3 | [31:0] | Control reg. 1 |
| 2 | EFLAGS | [31:0] | Execution flags |
| 3 | EIP | [31:0] | Instruction pointer |
| 4 | EDI | [31:0] | EDI |
| 5 | ESI | [31:0] | ESI |
| 6 | EBP | [31:0] | EBP |
| 7 | ESP | [31:0] | ESP |
| 8 | EBX | [31:0] | EBX |
| 9 | EDX | [31:0] | EDX |
| 10 | ECX | [31:0] | ECX |
| 11 | EAX | [31:0] | EAX |
| 12 | DR6 | [31:0] | debug status register (initial state) |
| 13 | DR7 | [31:0] | debug control register |
| 14 | TR | [15:0] | Task selector |
| 15 | LDTR | [15:0] | Local Descriptor table selector |
| 16 | GS | [15:0] | GS selector |
| 17 | FS | [15:0] | FS selector |
| 18 | DS | [15:0] | DS selector |
| 19 | SS | [15:0] | SS selector |
| 20 | CS | [15:0] | CS selector |
| 21 | ES | [15:0] | ES selector |
| 22 | TSS_ATTR | [11:0] | task segment attribute |
| 23 | TSS_BASE | [31:0] | task segment base |
| 24 | TSS_LIM | [31:0] | task segment limit |
| 25 | IDTR_ATTR | [11:0] | interrupt descriptor attribute |
| 26 | IDTR_BASE | [31:0] | interrupt descriptor base |
| 27 | IDTR_LIM | [31:0] | interrupt descriptor limit |
| 28 | GDTR_ATTR | [11:0] | global descriptor attribute |
| 29 | GDTR_BASE | [31:0] | global descriptor base |
| 30 | GDTR_LIM | [31:0] | global descriptor limit |
| 31 | LDTR_ATTR | [11:0] | local descriptor attribute |
| 32 | LDTR_BASE | [31:0] | local descriptor base |
| 33 | LDTR_LIM | [31:0] | local descriptor limit |
| 34 | GS_ATTR | [11:0] | GS segment attribute |
| 35 | GS_BASE | [31:0] | GS segment base |
| 36 | GS_LIM | [31:0] | GS segment limit |
| 37 | FS_ATTR | [11:0] | FS segment attribute |
| 38 | FS_BASE | [31:0] | FS segment base |
| 39 | FS_LIM | [31:0] | FS segment limit |
| 40 | DS_ATTR | [11:0] | DS segment attribute |
| 41 | DS_BASE | [31:0] | DS segment base |
| 42 | DS_LIM | [31:0] | DS segment limit |
| 43 | SS_ATTR | [11:0] | SS segment attribute |
| 44 | SS_BASE | [31:0] | SS segment base |
| 45 | SS_LIM | [31:0] | SS segment limit |
| 46 | CS_ATTR | [11:0] | CS segment attribute |
| 47 | CS_BASE | [31:0] | CS segment base |
| 48 | CS_LIM | [31:0] | CS segment limit |
| 49 | ES_ATTR | [11:0] | ES segment attribute |
| 50 | ES_BASE | [31:0] | ES segment base |
| 51 | ES_LIM | [31:0] | ES segment limit |
| 52 | EIP_PREV | [31:0] | previous EIP |
| 53 | IO_TRAP | [31:0] | I/O trap word |
| 54 | RESTART | [31:0] | I/O [31:16] and HALT [15:0] restart words |
| 55 | REV_ID | [31:0] | SMM revision identifier |
| 56 | SMBASE | [31:0] | State dump base |
| 57 | DR6_UPDATE | [31:0] | Updated DR6 |
| 59 | CR2 | [31:0] | CR2 |
| 60 | DR0 | [31:0] | breakpoint 0 linear address |
| 61 | DR1 | [31:0] | breakpoint 1 linear address |
| 62 | DR2 | [31:0] | breakpoint 2 linear address |
| 63 | DR3 | [31:0] | breakpoint 3 linear address |

The ordering or the presence of any particular command shown in Table 8 is not considered critical to the invention but show an exemplary set of commands for use on one version of an X86 processor.

Use of the bond-out port provides full visibility of execution history, without requiring throttling back of the processor core 104. The trace cache 200, if needed, can be configured for use as a buffer to the parallel port 214 to alleviate any bandwidth matching issues.

The parallel port is enabled by setting DSCR:3 to a logic 1 via the serial port. The serial port interface is not disabled when the parallel port is enabled and must be used for access while the processor is executing instructions.

In the disclosed embodiment of the invention, an instruction trace record is 20 bits wide and consists of two fields, TCODE (Trace Code) and TDATA (Trace Data). A valid bit V may also be included. The TCODE field is a code that identifies the type of data in the TDATA field. The TDATA field contains software trace information used for debug purposes.

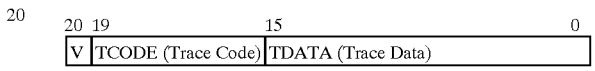

In one contemplated embodiment of the invention, the embedded processor device 102 reports eleven different trace codes as set forth in table 9:

TABLE 9

| TCODE # | TCODE Type | TDATA |
|---|---|---|
| 0000 | Missed Trace | Not Valid |
| 0001 | Conditional Branch | Contains Branch Sequence |
| 0010 | Branch Target | Contains Branch Target Address |
| 0011 | Previous Segment Base | Contains Previous Segment Base Address and Attributes |
| 0100 | Current Segment Base | Contains Current Segment Base Address and Attributes |
| 0101 | Interrupt | Contains Vector Number of Exception or Interrupt |
| 0110 | Trace Synchronization | Contains Address of Most Recently Executed Instruction |
| 0111 | Multiple Trace | Contains 2nd or 3rd Record of Entry With Multiple Records |
| 1000 | Trace Stop | Contains Instruction Address Where Trace Capture Was Stopped |
| 1001 | User Trace | Contains User Specified Trace Data |
| 1010 | Performance Profile | Contains Performance Profiling Data |

The trace cache 200 is of limited storage capacity; thus a certain amount of "compression" in captured trace data is desirable. In capturing trace data, the following discussion assumes that an image of the program being traced is available to the host system H. If an address can be obtained from a program image (Object Module), then it is not provided in the trace data. Preferably, only instructions which disrupt the instruction flow are reported; and further, only those where the target address is in some way data dependent. For example, such "disrupting" events include call instructions or unconditional branch instructions in which the target address is provided from a data register or other memory location such as a stack.

As indicated in the preceding table, other desired trace information includes: the target address of a trap or interrupt handler; the target address of a return instruction; a conditional branch instruction having a target address which is data register dependent (otherwise, all that is needed is a 1-bit trace indicating if the branch was taken or not); and, most frequently, addresses from procedure returns. Other information, such as task identifiers and trace capture stop/ start information, can also be placed in the trace cache 200. The precise contents and nature of the trace records are not considered critical to the invention.

FIG. 6A illustrates an exemplary format for reporting conditional branch events. In the disclosed embodiment of the invention, the outcome of up to 15 branch events can be grouped into a single trace entry. The 16-bit TDATA field (or "BFIELD") contains 1-bit branch outcome trace entries, and is labeled as a TCODE=0001 entry. The TDATA field is initially cleared except for the left most bit, which is set to 1. As each new conditional branch is encountered, a new one bit entry is added on the left and any other entries are shifted to the right by one bit.

Using a 128 entry trace cache 200 allows 320 bytes of information to be stored. Assuming a branch frequency of one branch every six instructions, the disclosed trace cache 200 therefore provides an effective trace record of 1,536 instructions. This estimate does not take into account the occurrence of call, jump and return instructions.

In the disclosed embodiment of the invention, the trace control logic 218 monitors instruction execution via processor interface logic 202. When a branch target address must be reported, information contained within a current conditional branch TDATA field is marked as complete by the trace control logic 218, even if 15 entries have not accumulated. As shown in FIG. 6B, the target address (in a processor-based device 102 using 32-bit addressing) is then recorded in a trace entry pair, with the first entry (TCODE=0010) providing the high 16-bits of the target address and the second entry (TCODE=0111) providing the low 16-bits of the target address. When a branch target address is provided for a conditional jump instruction, no 1-bit branch outcome trace entry appears for the reported branch.

Referring now to FIG. 6C, it may be desirable to start and stop trace gathering during certain sections of program execution; for example, when a task context switch occurs. When trace capture is stopped, no trace entries are entered into the trace cache 200, nor do any appear on the bond-out pins of trace port 214.

Different methods are contemplated for enabling and disabling trace capture. For example, an x86 command can be provided, or an existing x86 command can be utilized to toggle a bit in an I/O port location. Alternatively, on-chip breakpoint control registers (not shown) can be configured to indicate the addresses where trace capture should start/stop. When tracing is halted, a trace entry (TCODE=1000, TCODE=0111) recording the last trace address is placed in the trace stream. When tracing is resumed, a trace synchronization entry (TCODE=0110, TCODE=0111) containing the address of the currently executing instruction is generated.

It may be important to account for segment changes that occur while tracing is stopped. This situation can be partially resolved by selecting an option to immediately follow a TCODE=1000 entry with a current segment base address entry (TCODE=0100, TCODE=0111), as shown in FIG. 6C. A configuration option is also desirable to enable a current segment base address entry at the end of a trace prior to entering Debug mode. By contrast, it may not be desirable to provide segment base information when the base has not changed, such as when an interrupt has occurred.

Referring to FIG. 6D, following the occurrence of an asynchronous or synchronous event such as an interrupt or trap, a TCODE=0101 trace entry is generated to provide the address of the target interrupt handler. However, it is also desirable to record the address of the instruction which was interrupted by generating a trace synchronization (TCODE=0110) entry immediately prior to the interrupt entry, as well as the previous segment base address (TCODE=0011). The trace synchronization entry contains the address of the last instruction retired before the interrupt handler commences.

FIG. 6E illustrates a trace entry used to report a change in segment parameters. When processing a trace stream in accordance with the invention, trace address values are combined with a segment base address to determine an instruction's linear address. The base address, as well as the default data operand size (32 or 16-bit mode), are subject to change. As a result, the TCODE=0011 and 0111 entries are configured to provide the information necessary to accurately reconstruct instruction flow. The TDATA field corresponding to a TCODE=0011 entry contains the high 16-bits of the previous segment base address, while the associated TCODE=0111 entry contains the low 15 or 4 bits (depending on whether the instruction is executed in real or protected mode). The TCODE=0111 entry also preferably includes bits indicating the current segment size (32-bit or 16-bit), the operating mode (real or protected), and a bit indicating whether paging is being utilized. Segment information generally relates to the previous segment, not a current (target) segment. Current segment information is obtained by stopping and examining the state of the processor core 104.

There are circumstance when an application program or operating system may wish to add additional information into a trace stream. For this to occur, an x86 instruction is preferably provided which enables a 16-bit data value to be placed in the trace stream at a desired execution position. The instruction can be implemented as a move to I/O space, with the operand being provided by memory or a register. When the processor core 104 executes this instruction, the user specified trace entry is captured by the trace control logic 218 and placed in the trace cache 200. As shown in FIG. 6F, a TCODE=1001 entry is used for this purpose in the disclosed embodiment of the invention. This entry might provide, for example, a previous or current task identifier when a task switch occurs in a multi-tasking operating system.

When executing typical software on a processor-based device 102 according to the disclosed embodiment of the invention, few trace entries contain address values. Most entries are of the TCODE=0001 format, in which a single bit indicates the result of a conditional operation. When examining a trace stream, however, data can only be studied in relation to a known program address. For example, starting with the oldest entry in the trace cache 200, all entries until an address entry are of little use. Algorithm synchronization typically begins from a trace entry providing a target address.

The processor can provide trace synchronization information to ensure that address information for reconstructing instruction execution flow is provided in trace records with sufficient frequency. If the trace cache 200 contains no entries providing an address, then trace analysis cannot occur. This situation is rare, but possible. A trace record (or an indication in a trace record), is provided for instructions that change the program flow such as conditional branches. However, as previously discussed, target address information is not provided in the trace record for instructions such as conditional branches where the branch target address can be determined according to whether the branch was taken or not taken. In such cases, the trace record provides only an indication of whether the branch was taken. Target or other address information is provided, however, for those instructions in which the target address is in some way data dependent and for other TCODES shown in Table 9.

The processor determines whether each trace record includes target address information. Each trace entry having target address information causes a counter to be loaded to a predetermined value which allows the counter to count the desired maximum number of trace records generated before current program address information is provided. Thus, depending on if the counter is configured as an up counter or down counter, the counter is either loaded with zero or the maximum count, respectively. The counter counts each trace record produced which does not include target address information. When the count of such trace records reaches the predetermined number; trace logic provides the current program address as a trace entry, thereby providing the trace synchronization information.

For this reason, a synchronization register TSYNC is provided to allow injection of synchronizing address information. In the disclosed embodiment, TSYNC contains 7 bits. If the synchronization register TSYNC is set to zero, then trace synchronization entries are not generated.

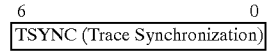

FIG. 6G depicts an exemplary trace synchronization record. The first entry, with a TCODE=6, provides the most significant 16 bits of the extended instruction pointer (EIP) for the current instruction logical address. The next entry, TCODE=7, provides the least significant 16 bits.

Trace entry information can also be expanded to include data relating to code coverage or execution performance. This information is useful, for example, for code testing and performance tuning. Even without these enhancements, it is desirable to enable the processor core 104 to access the trace cache 200. In the case of a microcontroller device, this feature can be accomplished by mapping the trace cache 200 within a portion of I/O or memory space. A more general approach involves including an instruction which supports moving trace cache 200 data into system memory.

OPERATING SYSTEM AND DEBUGGER INTEGRATION

It is advantageous to integrate debug support into the operating system (OS). Specifically, the operating system according to the present invention exploits the hardware and/or microcoded support for debug and particularly for accessing trace memory 200. The debug support may go in the kernel of the OS, may exist as a separate task in the OS or may be a combination of both. The debug support in the OS provides such capabilities typically associated with debug mode operations such as accessing registers and memory locations. The operating system also provides access to the trace memory 200 which provides substantial advantages as discussed further herein. For example, with access to trace information, the operating system can even analyze trace records provided in trace memory 200. If an operating system can control the on-chip trace memory 200 which records program execution, the integration of an ICE-like trace capability with operating system behavior can be successfully achieved. Thus, superior debug capability can be provided with substantial savings in costs because no external expensive ICE like support hardware is necessary.

As discussed previously, the number of embedded systems making use of multi-tasking operating systems is growing. A number of multi-tasking operating systems (OS) are known which are suitable for embedded and other applications. Exemplary operating systems include Microsoft's Windows CE (see BYTE, August 1997, pages 103–107); WindRiver's VxWorks; RISC OS which operates on Acorn RISC machine (ARM) based computers such as the ARM610, ARM700, ARM7500 and StrongARM microprocessors (see BYTE, December 1996, pp 49–50); an object oriented multi-threaded real time operating systemOS called EPOC32 available from Psion Software PLC (see BYTE October 1997, pp. 45–46).

Figure 7:
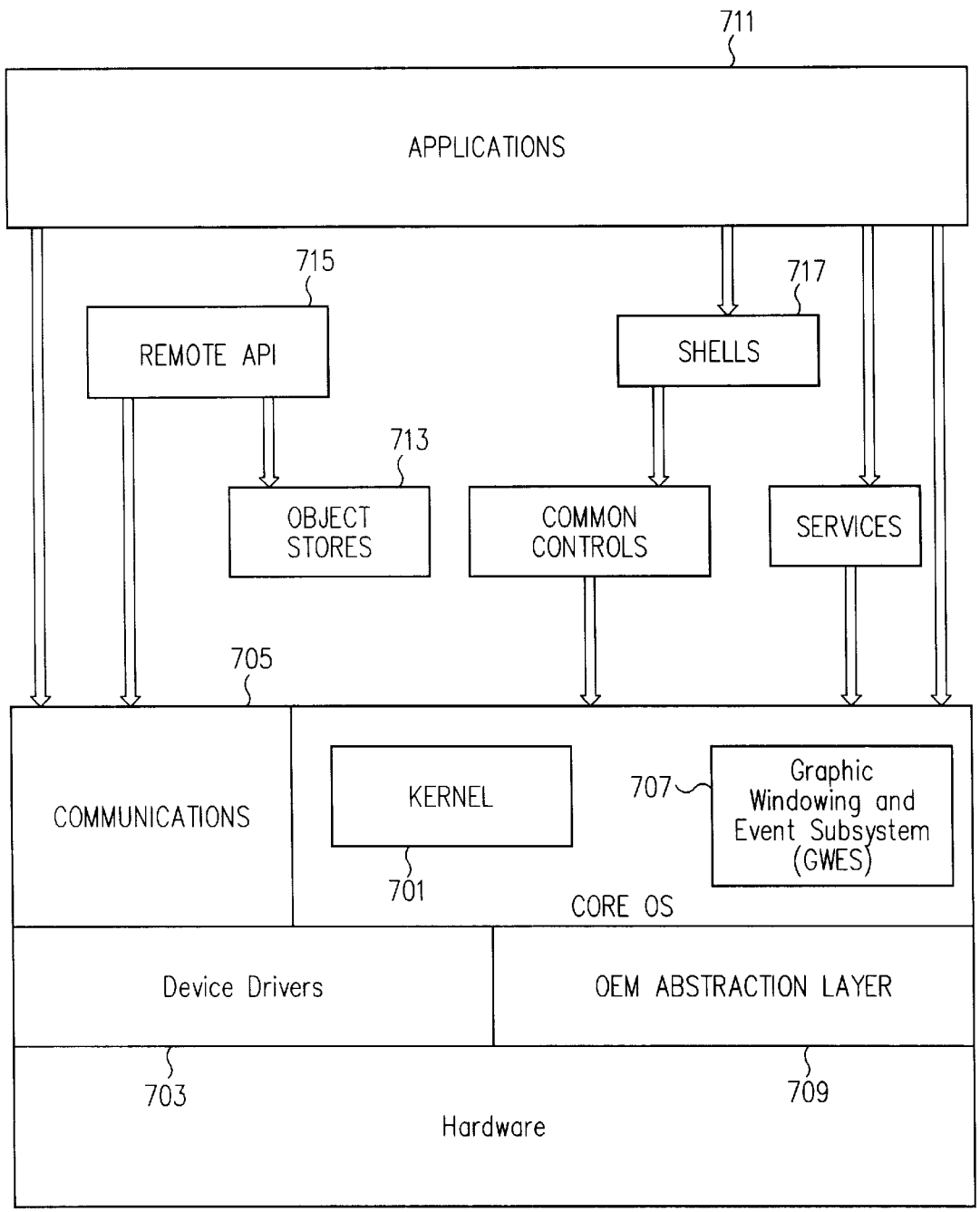
FIG. 7 shows an operating system configurable according to the present invention.

In a multi-tasking operating system, the kernel typically provides basic services such as memory allocation, interrupt handling functions, allocating system resources, controls launching of various executable threads. An exemplary operating system is shown in block diagram form in FIG. 7, which is a Windows CE-like operating system. Operating systems for real time systems are typically highly modular to allow minimum configurations to be achieved for embedded systems.

The various parts of the operating system include device drivers 703, communications services 705, graphics support 707 and additional components. The kernel 701 provides the basic services previously described and in one embodiment is a multi-threaded, and supports preemptive multi-tasking. For example, the kernel will respond to an interrupt by launching the appropriate interrupt handler or thread. Abstraction layer 709 provides an interface between a particular OEM's hardware and the kernel. The abstraction layer may also provide power management features and interrupt services. Because it is advantageous for an operating system to be able to run on a variety of microprocessor platforms, the hardware abstraction level allows the operating system to exploit the particular implementation for access to a trace cache that may evolve on different hardware platforms. One such implementation is described herein.

Device drivers 703 are built-in device support for input/output such as keyboards and other devices. Object stores 713 provide such storage as file systems, registry and database support. Communications 705 can provide LAN connectivity, TCP/IP, PPP and other communications support. The remote AOIs provide desktop devices utilizing desktop operating systems such as Windows to access Windows CE devices. The shells 717 provides shells (e.g. Windows) if needed for the particular application.

Many other operating systems mentioned earlier have similar components and can readily be adapted to incorporate the support for debug hooks described herein.

In addition to the kernel, other application task(s) 711 run on the system. Getting systems running that include a multi-tasking operating system involves debugging in steps. First the kernel is debugged. Once the kernel is debugged and the debug software provided with the OS can be successfully utilized, one can begin application mode debugging. Often there are difficult tool transitions required as debugging proceeds from kernel-mode to application-mode.

Incorporating debug support directly into the OS to exploit on-chip debug logic enables an operating system to be free from the typical restrictions imposed by ROM monitors. Such an operating system avoids the need to first install a monitor in a reserved memory region before commencing kernel and driver configuration for the system being debugged. Thus embedded tool users will be attracted to such an operating system. Debugging can start immediately with a system running from RAM with nothing preinstalled in the target memory system. The debug port taught in the present invention is usable at all Stages of debug, including kernel and application. That allows the task of debug to be greatly streamlined.

Figure 8:
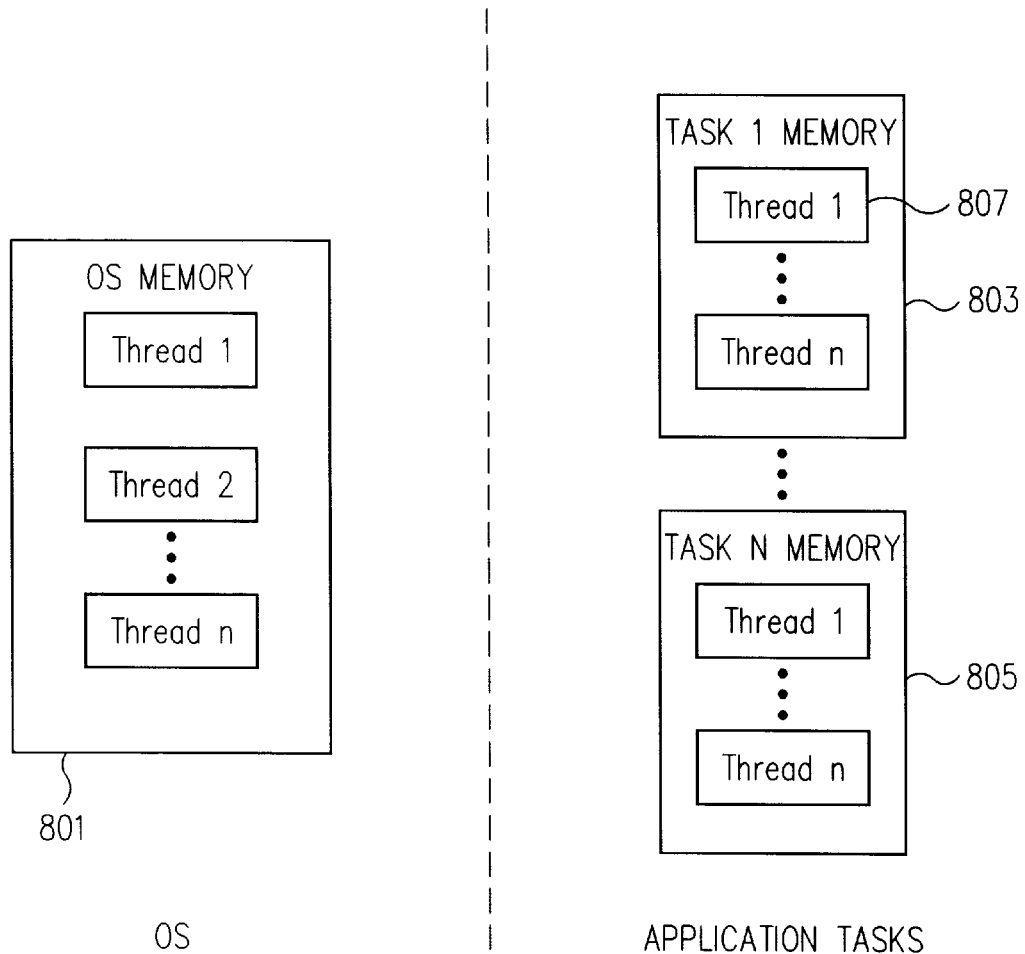
FIG. 8 shows allocation of memory between the OS and application tasks in a multi-tasking, multi-threaded operating system environment.

In addition, since the operating system has the capability to write to the trace memory, additional trace capabilities can be provided. For instance, it is typical in multi-tasking operating systems for multiple tasks or processes to be running and for multiple threads to be running within each task. It is desirable to trace within a specific thread or task. Referring to FIG. 8, an exemplary memory allocation is shown for a multi-threaded, multi-tasking OS. The OS memory area is shown at 801 with multiple threads (thread 1 to thread n) running within the OS. In the application memory area, two separate memory areas 803 and 805 are shown as task 1 and task n. Within each application task are multiple threads.

Application task switching typically involves switching memory address space from e.g., memory space 803 to memory space 805. A full task switch in some processor architectures may cause such events as flushing of caches and translation look-aside buffers (TLBs). In other processor architectures the cache and/or TLB may be marked with a task identifier. Thus, flushing would not be necessary since it would be known, e.g., that the cache entries were for a different task from the task identifier. A thread switch, e.g., from thread 1 to thread n, is normally less work for the operating system and switches execution path within the same address space. A thread switch may be considered a form of task switch within the same address space. Generically speaking, a task or thread can be referred to as an execution thread. A heavy weight execution thread is a task or process while a light weight execution thread, typically executing within a task or process, is simply referred to as a thread.

As mentioned, it is often desirable to trace on a particular application task, process, or thread within an application task. To the engineer or programmer examining the trace results, or the trace algorithm developer, the thread information incorporated in the trace information provides the identify of the execution thread being traced. In one embodiment, in order to know which task is now being traced, the operating system examines the task control block and writes some content (e.g., the task ID) from the task control block into the trace memory to identify the task or thread. The operating system can identify an application task or thread switch in the trace memory by entering a code into a user defined TCODE indicating the task ID or thread ID that is being switched to or that was switched from. When a subsequent task switch occurs, the operating system can notify the trace control logic that such a switch occurred in order to stop tracing when the processor is no longer executing code associated with that particular task.

Every task or thread typically has a control region that describes the task or thread. For tasks, that region stores key task information such as program counter information, register resources that were in use, memory management information. Whenever the operating system switches from a first task to a second, e.g., from 803 to 805, the control region describing the system for the second task at the point at which it was previously stopped is loaded back into the registers of the processor and the second task is restarted at the point at which it was stopped.

When an engineer or programmer wants to debug a particular executable thread, the identify of the task or thread to be traced is provided over the debug port. The debug logic, in one embodiment, makes a privileged system call to the operating system and tells the operating system which task or thread is desired to be traced. Alternatively, the debug host can talk directly to the kernel through the debug port control logic. The operating system places an indicator or tag in the control memory region reserved for the task or thread so that when the task or thread again becomes the highest priority task or thread, that is, when the OS restores all the register contents, the OS also checks the indicator to see if that particular task is to be traced. If the task is to be traced, then the OS has to take extra steps to write information into the trace memory 200 to indicate that the particular task is starting up and provide an indication to trace control logic. Thus, when reconstructing execution flow, it is known which task or thread is running.

It is also possible to maintain the task ID and even thread ID in a task or thread hardware ID register. A second register is loaded with the ID of the executable thread to be traced which is provided from the debug port. When the IDs in the two registers match, which can be determined using a simple comparator, the tracing can begin or restart. Microcode and/or control logic can be used to load the task ID into the trace memory to indicate that the task is being traced. When the IDs no longer match, tracing is stopped. A separate indication can be entered into the trace memory indicating that tracing is stopped.

In still another embodiment, the trace on executable thread can be combined with other trace control such as trace on instruction address or value, or data address or value. Thus, when a particular address within a particular executable thread is utilized, tracing begins. The debug port could provide both the executable thread ID and the particular address or data value on which to trace.

It is also desirable to trace according to privilege level. Thus, when entering a system privilege level "ring 0 or 1", the trace logic can stop tracing. When one is debugging a task, one may not be interested in tracing system level calls such as the system's response to a timer interrupt. Trace on privilege thus allows trace to be stopped when a system call is made while an application is being traced. The operating system can provide the trace logic with information as to privilege level or hardware approaches can be utilized similar to those described in relation to trace on executable thread control. When the code that is executing returns to the appropriate privilege level, the trace can be started or restarted as appropriate.

In order to identify the task or thread in the trace memory, the OS can write a unique code into the portion of the user defined trace instruction to identify that the trace record is a task or thread entry. Alternatively, a unique TCODE can be provided which is utilized to identify threads and/or tasks. Such a TCODE can be reserved to be utilized by a certain privilege level within the computer system, to prevent confusion or conflict with other software controlled TCODEs.

In another embodiment, a certain range of bits in the User defined TCODE can only by accessed by the operating system and access to those bits becomes privileged. Thus, there is no confusion or conflict between users writing into the trace memory with user defined entries and the operating system writing into trace entries to identify threads or tasks.

Still other advantages are provided by enabling the operating system or tasks running under it, to access the trace cache. For example, instead of providing trace information in the trace cache, it may be sufficient in certain circumstances to write just the task IDs into the trace cache. Thus, a sequence of IDs provides the sequence of task execution rather than instruction execution. Further, since many internal timers are typically available in processors, a time stamp can be included in the information provided in the trace cache. Also, it may be of interest to write information relating to peripheral devices into the trace memory. For example, if a particular application task controls a peripheral device, the status information relating to the peripheral device may be written in to the trace memory to facilitate debug.

By operating with a processor incorporating hardware and/or microcode specifically to support debug, debug support routines can be moved out of the system memory and into the onchip microcode or control logic. Instead of receiving monitor commands via a UART, the processor receives commands directly from a dedicated Software Debug Port (SDP). The SDP provides a communication path between the target and the host platform. Thus, the operating system according the present invention can be free from typical restrictions imposed by ROM monitors. Embedded tool users will be attracted to such an operating system because of the simplicity of avoiding the need to first install a monitor in a reserved memory region. Debugging can start immediately with a system running from RAM and nothing preinstalled in the target memory system.

Using a processor equipped with an on-chip trace capability fulfills a primary tool requirement for many embedded projects. Enabling an operating system to utilize the trace data provides a debug environment with very high capability Given that the trace data can be accessed by the target processor itself or provided to a remote host which is controlling the target, there is great flexibility in how the data can be utilized. Utilizing the on-chip trace memory supports tracing both kernel-mode and application-mode debugging.

The incorporation of on-chip trace memory enables tracing to be performed without intruding into (slowing down) program execution. There is no need to turn off on-chip caches to provide for visibility into processor operation. And, of course, there are none of the packaging or connection problems associated with traditional ICE.

It would be desirable to extend tool functions associated with a particular operating system to process and display trace data. Traditionally, PC debug tools have not had this capability available. Such an enhancement would be perceived by many embedded project engineers as a significant feature.

In the disclosed embodiment of the invention, the operation of all debug supporting features, including the trace cache 200, can be controlled through commands issued to the debug port 100 from the debug host controller or via processor instructions.

Examples of processor instructions used to support internal loading and retrieving of trace cache 200 in one embodiment of the invention include a load instruction trace cache record command LITCR and a store instruction trace cache record command SITCR. The command LITCR loads an indexed record in the trace cache 200, as specified by a trace cache pointer ITREC.PF, with the contents of the EAX register of the processor core 104. The trace cache pointer ITREC.PTR is pre-incremented, such that the general operation of the command LITCR is as follows:

ITREC.PTR<-ITREC.PIR+1;
ITREC{ITREC.PTR}<-EAX.

In the event that the instruction trace record (see description of trace record format below) is smaller that the EAX register, only a portion of the EAX register is utilized.

Similarly, the store instruction trace cache record command SITCR is used to retrieve and store (in the EAX register) an indexed record from the trace cache 200. The contents of the ECX register of the processor core 104 are used as an offset that is added to the trace cache pointer ITREC.PTR to create an index into the trace cache 200. The ECX register is post-incremented while the trace cache pointer ITREC.PTR is unaffected, such that:

EAX<-ITREC{ECX+ITREC.PTR};
ECX<-ECX+1.

Numerous variations to the format of the LITCR and SITCR commands will be evident to those skilled in the art. For example, the load and store instructions may access the trace memory based on indirect addressing using an address in a memory location pointed to by one of the processor registers. Further, when reading from the trace memory, the instruction may contain a field specifying which processor register should receive the data read from the trace memory. Also, an instruction writing data to the trace memory could utilize an immediate field in the instruction for the data.

Extending an operating system to support on-chip trace has certain advantages within the communications industry. It enables the system I/O and communication activity to be maintained while a task is being traced. Traditionally, the use of an in-circuit emulator has necessitated that the processor be stopped before the processor's state and trace can be examined, unlike ptrace( ). This disrupts continuous support of I/O data processing.

Additionally, the trace cache 200 is very useful when used with equipment in the field. If an unexpected system crash occurs, the trace cache 200 can be examined to observe the execution history leading up to the crash event. When used in portable systems or other environments in which power consumption is a concern, the trace cache 200 can be disabled as necessary via power management circuitry.

Thus, a processor which provides a flexible, high-performance solution for furnishing instruction trace information and an operating system to exploit that processor has been described. The processor-based device incorporates an instruction trace cache capable of providing trace information for reconstructing instruction execution flow on the processor without halting processor operation. Both serial and parallel communication channels are provided for communicating trace data to external devices. The disclosed on-chip instruction trace cache alleviates various aspects of the bandwidth and clock synchronization problems that arise in many existing solutions, and also allows less expensive debug capture hardware to be utilized.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of operating a computer system including a processor, comprising:

said processor executing a trace access instruction stored in a memory for storing instructions executable by said processor, to access an on-chip trace memory on said processor, said trace memory having a plurality of locations for storing trace information indicative of execution flow of a plurality of said instructions in said processor.

2. The method as recited in claim 1 wherein said trace access instruction is a write instruction, said write instruction writing data identified by said trace access instruction to one of said locations in said trace memory.

3. The method as recited in claim 2 further comprising executing a second trace access instruction stored in said memory, and wherein said second trace access instruction is a read instruction, said read instruction reading data from one of said locations in said trace memory, said one location containing data indicative of execution flow of previously executed instructions of said processor.

4. The method as recited in claim 1 wherein said trace access instruction is a read instruction, said read instruction reading data from one of said locations in said trace memory, said one location containing data indicative of execution flow of previously executed instructions of said processor.

5. The method as recited in claim 4 further comprising executing a second trace access instruction stored in said memory, and wherein said second trace access instruction is a write instruction writing data identified by said second trace access instruction to one of said locations in said trace memory.

6. The method as recited in claim 1 further comprising:
providing to said processor an indication to trace on execution of an executable thread thereby indicating to said processor to provide trace information when said executable thread executes;
starting execution of said executable thread; and
providing an identifier corresponding to said executable thread into said trace memory to indicate that subsequent entries placed into said trace memory are part of said executable thread.

7. The method as recited in claim 6 wherein providing said identifier uses said trace access instruction to write said identifier into said trace memory.

8. The method as recited in claim 6 further comprising the processor placing trace information into said trace memory reflecting instruction execution flow in said executable thread.

9. The method as recited in claim 8 further comprising stopping placing said trace information into said trace memory in response to execution of said executable thread being stopped.

10. The method as recited in claim 6 further comprising:
writing a code associated with said identifier into said trace memory to indicate that data in said trace memory associated with said code is said identifier.

11. The method as recited in claim 10 wherein a portion of a record in said trace memory is reserved for writing said identifier, write access to said portion of said record requiring a predetermined system privilege level.

12. The method as recited in claim 6 wherein a debug host provides said processor with said indication to trace on execution of said executable thread, via a debug port on said processor.

13. The method as recited in claim 6 wherein said executable thread is one of a task and a thread.

14. The method as recited in claim 1 further comprising:
storing trace information into said trace memory prior to said trace access instruction when code is executing at a first privilege level, and stopping storing into said trace memory when code is executed at a second privilege level.

15. The method as recited in claim 14 wherein said first privilege level is of an application task and said second privilege level being of a system task.

16. The method as recited in claim 2 wherein said data written into said trace memory is a time stamp.

17. The method as recited in claim 2 wherein said data written into said trace memory is a state of a hardware peripheral device.

18. A computer program embodied on computer readable media, for execution on a computer system including a processor, said processor including an on-chip trace memory, and a memory for storing instructions executable by said processor, the computer program comprising:
a trace access instruction executable by said processor, to access said trace memory on said processor, said trace memory having a plurality of locations for storing trace information indicative of instruction execution flow in said processor.

19. The computer program as recited in claim 18 wherein said trace access instruction is a write instruction, said write instruction writing data identified by said trace access instruction to one of said locations in said trace memory.

20. The computer program as in claim 19 further comprising executing a second trace access instruction stored in said memory, and wherein said second trace access instruction is a read instruction, said read instruction reading data from one of said locations in said trace memory, said one location containing data indicative of execution flow of previously executed instructions of said processor.

21. The computer program as recited in claim 18 wherein said trace access instruction is a read instruction, said read instruction reading data from one of said locations in said trace memory, said one location containing data indicative of execution flow of previously executed instructions of said processor.

22. The computer program as recited in claim 21 further comprising executing a second trace access instruction stored in said memory and wherein said second trace access instruction is a write instruction writing data identified by said second trace access instruction to one of said locations in said trace memory.

23. The computer program as recited in claim 18 further comprising:
a control segment maintaining a first identifier associated with an executable thread, said executable thread for execution on said processor;
a scheduler segment for starting execution of said executable thread;
wherein said computer program writes a second identifier, corresponding to said first identifier, into said trace memory to indicate that subsequent entries to said trace memory are part of said executable thread.

24. The computer program as recited in claim 23 wherein said computer program is a component of a multi-tasking operating system.

25. The computer program as recited in claim 24 wherein said executable thread is part of an application software program different from said operating system.

26. A method of operating a computer system including a processor and a memory storing instructions for said processor, the method comprising:
identifying an executable thread to trace as a first trace condition;
in response to said identifying step, storing an indicator that said executable thread is to be traced;
providing additional trace control information indicating when to enable tracing instruction execution flow within said executable thread, as a second trace condition; and
providing trace information indicating instruction execution flow when said first and second trace conditions are both true.

27. The method as recited in claim 26 wherein said additional trace control information provides an address at which to begin trace operations.

28. The method as recited in claim 26 wherein said additional trace control information provides a data value at which to begin trace operations.

29. The method as recited in claim 26 wherein said first and second trace conditions are provided to said processor by a debug host controller via a debug port on said processor.

30. The method as recited in claim 26 wherein information is written to a trace memory on said processor, said trace memory having a plurality of locations for storing said trace information.

31. An operating system including a trace handling component, said operating system for execution on a computer system including a processor and memory for storing instructions executable by said processor, the trace handling component comprising:

- a trace read instruction for accessing an on-chip trace memory on said processor, said trace read instruction being stored in said memory, said trace memory having a plurality of locations for storing trace information indicative of instruction execution flow in said processor; and
- a trace write instruction, said trace write instruction writing data identified by said trace write instruction to one of said locations in said trace memory.

32. The operating system as recited in claim 31 further comprising:

- control software maintaining a first identifier associated with one of a task and an executable thread, said executable thread for execution on said processor;
- scheduler software for starting execution of said executable thread; and
- wherein said computer program writes a second identifier, corresponding to said first identifier, into said trace memory to indicate that subsequent entries into said trace cache are part of said executable thread.

33. The operating system as recited in claim 32 wherein said second identifier is the same as said first identifier.

34. The method as recited in claim 1 wherein said trace access instruction is a write instruction and said write instruction writes data stored in a processor register to said trace memory.

35. The method as recited in claim 4 wherein said data read from one of said locations in said trace memory is stored into a processor register as a result of execution of said read instruction.

36. The method as recited in claim 4 wherein said data read from one of said locations in said trace memory is stored in a location determined by said read instruction.

* * * * *